United States Patent Office 3,446,246
Patented May 27, 1969

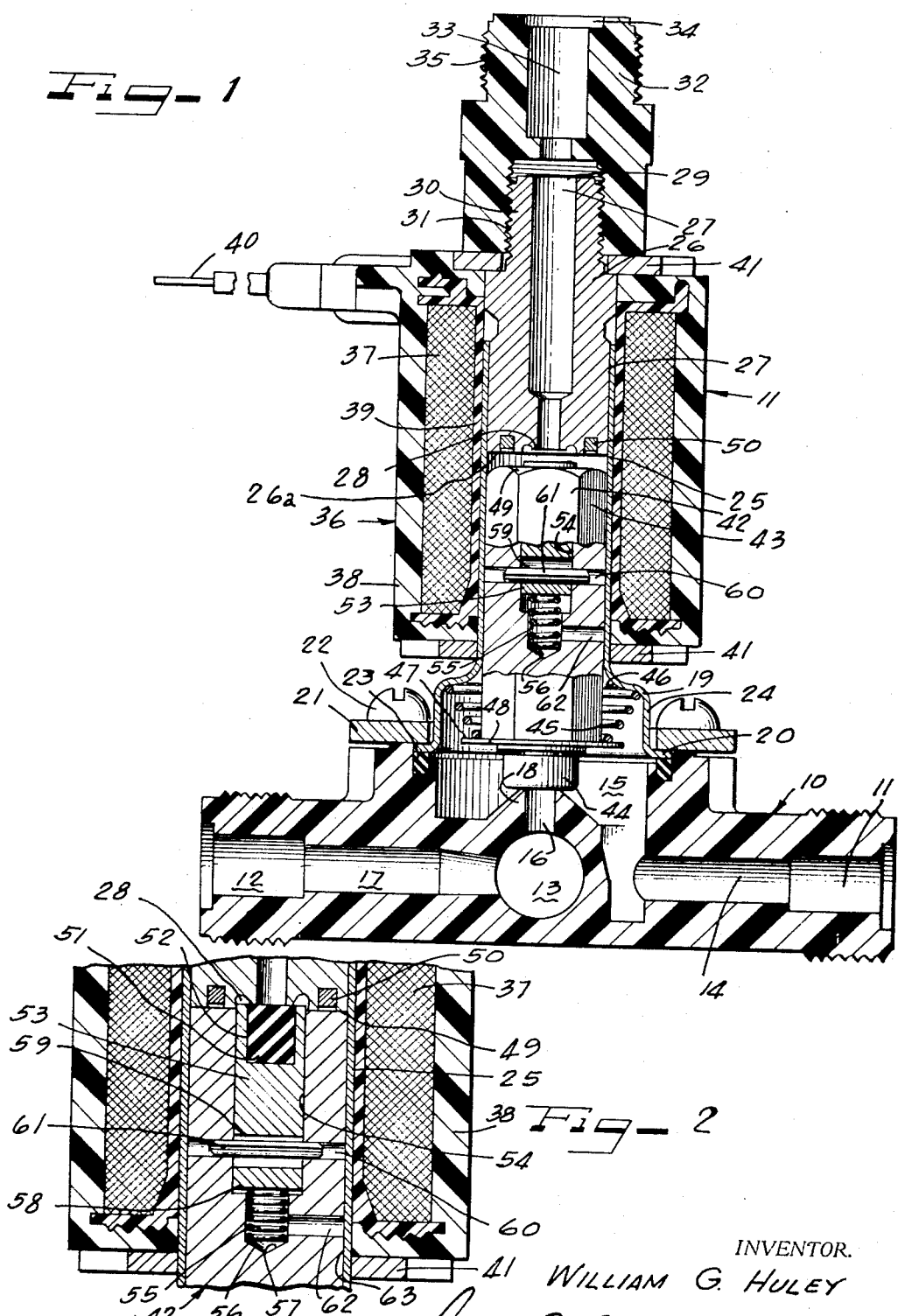

3,446,246
FLOW ADJUSTMENT VALVE
William G. Huley, Palatine, Ill., assignor to The Dole Valve Company, Morton Grove, Ill., a corporation of Illinois
Filed Jan. 18, 1966, Ser. No. 521,287
Int. Cl. F16k 11/04, 31/06
U.S. Cl. 137—625.5                    2 Claims

ABSTRACT OF THE DISCLOSURE

A flow adjustment valve having a pair of valve heads disposed at opposite end of a solenoid operated armature. One of the valve heads consists of a spring loaded piston which is disposed within a bore formed within the armature. Energizing of the solenoid moves the armature against a valve seat opening one of the valve heads and contacting the spring loaded piston against a second valve seat thereby eliminating chatter in the operation of the armature.

---

This invention relates to a flow adjustment valve and in particular to a valve having a deceleration valve pin for absorbing the shock of a rapidly closing valve head.

Solenoid-operated valves are commonly closed by de-energizing the solenoid and allowing a spring to drive the valve head into engagement at a valve seat. Substantial amounts of vibration and chatter which might otherwise be expected from the impact of closing the valve head are eliminated by the constant pressure of the biasing spring.

However, in many applications, the valve may be required to be closed by the energization rather than the de-energization of the solenoid. In such cases, vibration has been encountered upon the contact of the valve head at the valve seat. This occurs because the magnetic force associated with the solenoid is not entirely capable of holding the valve head against slight jarring movements commonly referred to as chatter. It is apparent that such vibration is undesirable. Most importantly hydraulic chatter is encountered in the operation of the valve member and prevents the quiet operation of the system.

Accordingly it is a principal object of this invention to provide a rapidly closing valve member which eliminates vibration and chatter upon impacting at a valve seat.

It is also a principal object of this invention to provide a solenoid operated valve having a valve head which employs a deceleration pin for absorbing the shock associated with the impact of the valve head at an associated valve seat.

It is another object of this invention to provide a solenoid-operated valve having an inlet and first and second outlets and employing a valve head for closing the first outlet due to the deenergization of the solenoid means and for closing the second outlet due to the energization of the solenoid means, wherein chatter and vibration associated with the closing of the second outlet is substantially eliminated.

It is another object of this invention to provide a valve head for a solenoid-operated valve wherein a shock pin is mounted centrally of the valve head and is spring loaded for diminishing hydraulic chatter and for absorbing the shock of decelerating the valve head due to impact with the associated valve seat.

It is an additional object of this invention to provide a valve head for a solenoid-operated valve having a shock pin deployed within the valve head and maintained therein through a lost-motion connection wherein a spring may be compressed by a predetermined amount for absorbing the shock associated with the impacting of the valve head at the associated valve seat.

These and other objects, features and advantages of the present invention will be understood in greater detail from the following description and the associated drawings wherein reference numerals are utilized in designating an illustrative embodiment and wherein:

FIGURE 1 is a sectional view of a three-way, solenoid-operated valve having the valve head decelerating characteristics of this invention, and FIGURE 2 is an enlarged sectional view of the valve head shown in FIGURE 1 in a closed position relative to the associated valve seat.

A valve having an inlet and first and second outlets has a variety of desirable uses such as dispensing water from the inlet to a first outlet and dispensing water from the inlet to a second outlet through a carbonator element or the like. In such three-way valves, it has been found desirable to use a single valve member for closing both the first and second outlets. A single valve member reduces the cost of the valve unit and most importantly, permits the use of a single solenoid element. However, if a single solenoid element is employed for operating a single valve head, the valve head must be biased into engagement at a first valve seat by a spring means and maintained into engagement at a second valve seat through the energization of the solenoid element alone.

As has been described, the closing of the valve head due to a spring-biasing means tends to reduce vibration and chatter which may otherwise be expected from the impact of the valve head at the associated valve seat. However, the closing of the single valve member at a second valve seat in response to the energization of the solenoid element may develop considerable vibration and chatter.

In this invention, the vibration and chatter associated with closing the valve member due to energization of the solenoid element is substantially eliminated by employing a shock pin which is spring loaded within a guide bore formed centrally of the valve head. The shock pin itself may be referred to as a secondary valve head in that the contacting of the shock pin at the associated valve seat effectively closes the flow of water from the inlet through the associated outlet. Some oscillation of the main valve member may occur after the impacting of the shock pin at the associated valve seat, however, the vibrations of the valve member itself will be maintained away from the valve seat such that chatter is eliminated.

Referring to the drawings in greater detail, FIGURE 1 shows a tri-orifice flow control valve having a valve body 10 and a control unit 11. The valve body 10 comprises an inlet 11 and outlet 12 and a flow adjustment port 13. The flow adjustment port may be used for receiving a control pin axially therein to restrict the flow of fluid from the inlet 11 to the outlet 12. The inlet 11 is communicable with the outlet 12 through a first flow passage 14, a flow control chamber 15, a vertical passage 16, the flow adjustment port 13 and an outlet passage 17. The vertical passage 16 has an apex wall portion 18 forming a valve seat which may be opened and closed by the solenoid valve member of the control section 11.

The control section 11 of the tri-orifice valve shown in FIGURE 1 is both a means for actuating a valve member and also a second valve outlet. The entire section is supported upon a valve guide 19 which has an outwardly extending flange 20. The flange 20 is fitted between the surface of the valve body 10 and a lock plate 21 which is secured thereto by a plurality of fasteners 22. A seal ring 23 is provided between the flange 20 and the valve body 10 to form a fluid pressure seal with the interior of the valve structure.

The guide member 19 has a radially enlarged portion 24 which acts as a continuation of the control chamber 15. The guide member 19 also has a guide portion 25 which acts both as a flow passageway and as a means for carrying the armature or valve member.

The second valve outlet is formed by two fittings which extend the flow passageway formed by the vertical portion 25 of the guide member 19. The first fitting 26 is fixedly secured at the inner surface of the vertical guide section 25. The fitting 26 may be welded or the like at the region 27 for forming a fluid pressure seal with the inner surface of the vertical guide section 25.

The fitting 26 has a flow passageway 27 which extends from a valve seat 28 to an opening 29. The opening 29 is formed centrally of a boss 30 which is threaded as at the region 31 for receiving a second outlet fitting 32. The second outlet fitting is threadedly received about the boss 30 and has a flow passageway 33 conducting to an opening 34. The fitting 32 is likewise threaded externally at the surface 35 and may receive a fitting, tubing or the like. A principal reason for the fitting 32 is to secure the solenoid coil and casing assembly 36 about the vertical guide section 25 of the guide member 19. It will be apparent to those skilled in the art that other suitable means may be employed for fastening the coil about the guide section.

The solenoid coil and casing 36 consist of a winding 37 encased within an inner sleeve 39 and an outer casing 38. The coil terminals extend from the casing 38 as at 40. A C-frame 41 extends about the casing assembly 36 and provides a path for the flux associated with the energization of the winding 37.

The valve member of this invention is the armature associated with the solenoid assembly and is slidably received within the vertical guide member 25. The armature 42 is octagonal in shape and is slidably received within the vertical guide member 25 which is circular in cross-section and which thereby provides a flow passageway between the flat faces of the octagonal configuration and the round inner surface of the guide member 25 as at 43.

The armature 42 has a first valve head 44 which is cooperable with the valve seat 18 formed at the apex wall of the vertical flow passage 16. The valve head 44 is mounted at the lower end of the armature 42 and is driven into engagement with the valve seat 18 by a coil spring member 45. The coil spring 45 is disposed between the inner surface 46 of the guide member 19 and the upper surface 47 of a washer 48 extending radially outwardly from the octagonal walls of the armature 42. As is well understood, the valve head 44 is lifted from the seat 18 by the energization of the coil 37 and is closed against the seat 18 by the deenergization of the coil 37 and by the biasing force of the coil spring 45.

The armature 42 has a second valve head 49 formed at the upper surface thereof which when closed against the surface 26a of the fitting 26 will prevent the flow of fluid through the outlet passageways 27 and 33. However, to eliminate the vibration which can be expected from the impact of the valve head 49 at the surface 26a, a second valve head is employed in this invention. It may be noted that a shading ring 50 is deployed within the surface 26a in a well understood manner.

The second valve head consists of a resilient plug 51 which is press fitted within a groove 52 formed centrally of a shock pin 53. The shock pin 53 is slidably received within a guide bore 54 and is spring biased therein for permitting a slow deceleration of the armature 42 when actuated by the winding 37. The introduction of the shock pin controls the seating force on the resilient plug 51. Essentially the shock pin 53 provides a constant seating force on the plug 51 regardless of the fluid pressure of the system and therefore improves the longevity of the seal.

The shock pin 53 is spring loaded within the guide bore 54 by two features. First, a coil spring 55 is disposed within a well 56 formed centrally of the guide bore 54. The springs acts against a surface 57 of the armature 42 and against the lower surface 58 of the shock pin 53. Second, a lost-motion connection maintains the shock pin within a given axial relationship at the interior of the guide bore 54. The lost-motion connection of a first slot 59 formed transversely of the shock pin 53 and a second slot 60 formed transversely of the armature 42. The slots 59 and 60 are held in alignment by a connector rod 61 which is fitted within the respective slots as shown in FIGURE 2. The height of the slot 59 is substantially greater than the height of the slot 60 such that the shock pin is provided with permissible axial movement within the guide bore equal to the difference in diameter between the slot 59 and the connector rod 61. To allow the flow of fluid freely from the guide bore 54 and from the well 56, a pressure relief port 62 is formed transversely from the well 56 to a face 63 of the octagonal armature 42.

Due to the spring mounting of the shock pin at the upper surface of the armature 42, the energization of the winding 37 which is necessary to close the second valve seat 28 will not develop chatter or noisy vibrations upon impacting the respective valve seat. Impact will occur first at the resilient plug 51 associated with the shock pin 53, and upon impact the shock pin will cause the spring 55 to be compressed within the well 56 acting as a shock absorber for the inertial motion of the armature 42. The armature 42 is gradually slowed into complete engagement at the valve seat 28 such that the surface 49 of the armature contacts surface 26a for further closing the flow of fluid to the second outlet formed by the passages 27 and 33.

I claim as my invention:

1. A flow control valve comprising:
  a valve body having an inlet leading thereinto and first and second outlets extending therefrom, a first flow passageway connecting said inlet with said first outlet and a second flow passageway connecting said inlet with said second outlet, said first and second flow passageways having first and second valve seats respectively formed therein,
  a solenoid and an associated armature operably disposed within said valve body,
  said armature having first and second valve heads cooperable with said first and second valve seats respectively for controlling the flow of fluid therethrough,
  said armature being biased for closing said first valve head and being actuated by said solenoid for opening said first valve head and closing said second valve head,
  said armature having a generally first plane surface at one end thereof and having a guide bore formed longitudinally in said armature at said first plane surface and adjacent to said second valve seat and having a shock pin slidably received within said guide bore,
  said shock pin having a spring loaded connection to said armature and having said second valve head secured thereto,
  said second valve head extending outwardly of said guide bore and above said first plane surface of said armature, said valve body having a second plane surface fixedly located adjacent to said first plane surface of said armature and said second valve seat being recessed within said second plane surface and being cooperable with said second valve head upon energization of said solenoid for closing the flow of fluid therethrough.

2. A flow control valve as described in claim 1 wherein a coil spring is disposed at the base of said guide bore intermediate said armature and said shock pin and wherein a slot is formed transversely of said pin for receiving a limit stop thereinto,
 a limit stop mounted within said armature and being received within said slot for restricting the longitudinal movement of said shock pin within said guide bore,
  said slot having a dimension parallel to the axis of said guide bore substantially greater than the corresponding dimension of said limit stop, whereby longitudinal movement of said shock pin is confined to not exceed the difference between said dimensions of said slot and said limit stop.

References Cited
UNITED STATES PATENTS

| | | | |
|---|---|---|---|
| 2,762,476 | 9/1956 | Gaylord et al. | 251—139 |
| 3,043,336 | 7/1962 | Parent et al. | 137—625.5 |
| 3,172,637 | 3/1965 | Adams et al. | 137—625.5 |

M. CARY NELSON, *Primary Examiner.*

M. O. STURM, *Assistant Examiner.*

U.S. Cl. X.R.

251—139